(No Model.)
F. W. CARPENTER.
DUST PAN.
No. 298,447. Patented May 13, 1884.
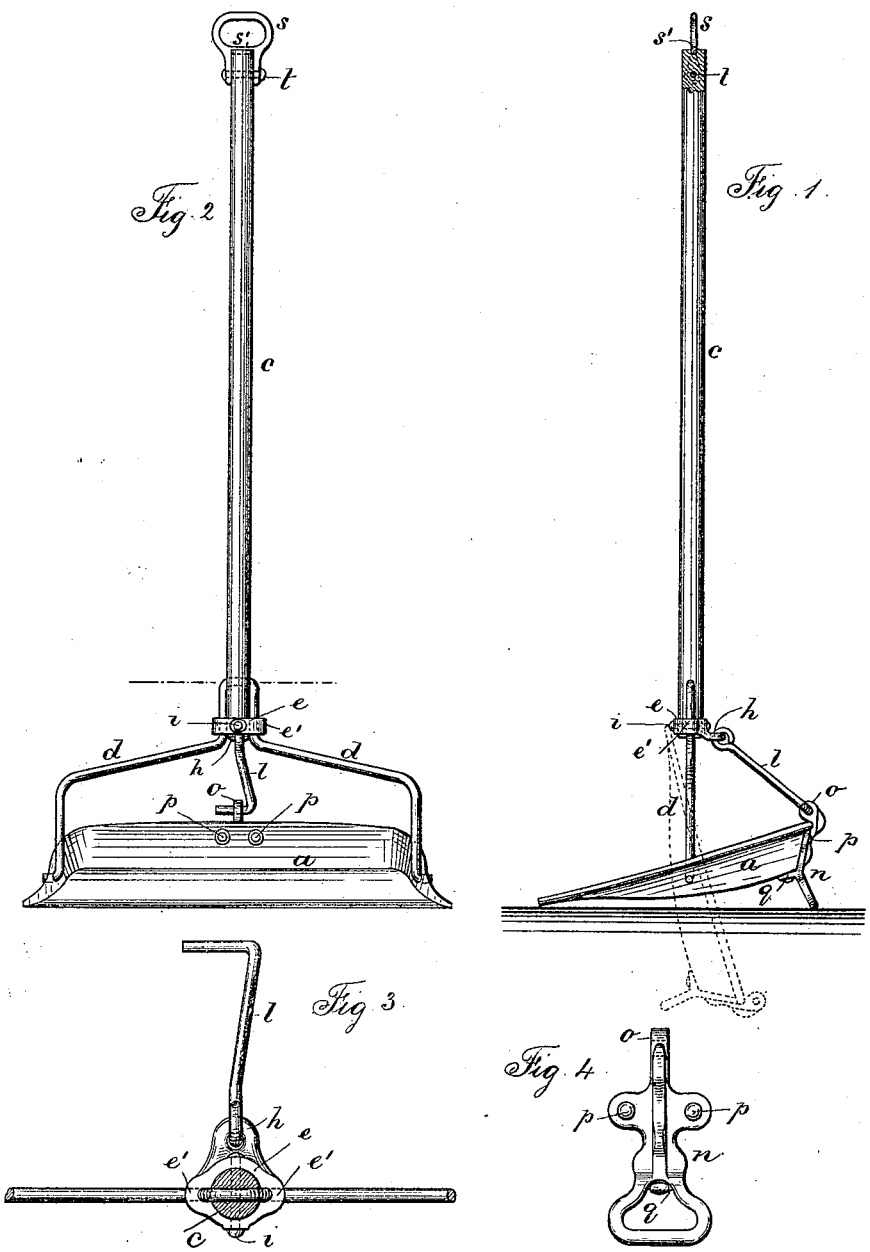

UNITED STATES PATENT OFFICE.

FRANCIS W. CARPENTER, OF HARRISON, NEW YORK.

DUST-PAN.

SPECIFICATION forming part of Letters Patent No. 298,447, dated May 13, 1884.

Application filed February 21, 1884. (No model.)

*To all whom it may concern:*

Be it known that I, FRANCIS W. CARPENTER, of Harrison, in the county of Westchester and State of New York, have invented an Improvement in Handles for Dust-Pans, &c., of which the following is a specification.

In Letters Patent No. 277,225, granted to me, a handle is represented as made with a bail, *f*, at the lower end, which is pivoted to the sides of the dust-pan, and a hook is provided between the handle and the back of the dust-pan.

My present invention is an improvement in the manner of constructing the handle and bail, and connecting the hook to the same and to the pan, and in the suspending-loop for the handle.

In the drawings, Figure 1 is a side view. Fig. 2 is a front view of the dust-pan and handle. Fig. 3 is a sectional plan, in larger size, of the handle at the intersection of the wire bail; and Fig. 4 is a separate view of the rest and eye for the hook.

The dust-pan *a* is to be of any desired size or shape or material. Usually it will be of sheet metal stamped up in dies, and provided with a wire edge around the sides and back. The handle *c* is of suitable material, preferably wood, and at the lower part the wire bail *d* is connected. One feature of my invention relates to this connection. I bore through the handle a transverse hole, about an inch and a half from the end, and I insert through the same the bail-wire, and then bend the outer portions at right angles to the part going through the wood, so that said outer portions are parallel to the handle. I then slip over the handle a clamping-band, *e*, which is of a size to fit said handle, and recessed or bowed at opposite sides, as at *e'*, to pass over, grasp, and hold the wire of the bail. This band is secured in place by a screw, rivet, or wedge. I have shown the rivet *i*. The bail-wire is bent out below the band into an arching or angular form, and its ends pass through holes in the sides of the dust-pan and become pivots for the same. This mode of connecting the wire bail to the handle by the band may be employed in mops and mop-holders and other articles. At the back of the band *e* there is an eye, *h*, the parts being preferably of cast metal. This eye receives one end of the hook *l*, and the other end of such hook enters an eye, *o*, at the upper end of the rest-piece *n*, which rest-piece is ribbed and riveted at *p* to the back part of the dust-pan. Preferably there is a flange, *q*, passing under the dust-pan, and upon which it rests, and the lower part is open, in the form of a loop or bow. The hook *l* is preferably pivoted at the eye *h* and hooks into the eye *o*. When unhooked, the pan can fold up parallel with the handle, as indicated by dotted lines. At the upper end of the handle there is a cast-metal suspending-loop, *s*, that is formed with a cross-piece, *s'*, which enters a deep groove across the upper end of the handle, and there is also a rivet, *t*, passing through the lower eye-shaped ends of the suspending-loop and through the handle. This makes a rigid suspending device, that is very strong, and it is easily applied to the handle.

If desired, the bent portion of the bail may extend downwardly below the clamping-band and pass through a hole or a notch at the lower end of the handle, instead of extending upwardly. If the two sides of the bail-wire are in separate pieces, the ends will approach each other where they enter the handle.

I claim as my invention—

1. The combination, with a handle, of a wire bail passed across through the handle and bent at the sides of and parallel to the handle, and a clamping-band slipped upon the handle and over the parallel portions of the bail-wire, substantially as set forth.

2. The combination, with the dust-pan, of a handle, a wire bail passing across the handle, and a metallic clamping-band slipped on, to include the handle and parallel portion of the bail-wire, substantially as set forth.

3. The metallic band *e*, having an eye, *h*, for the reception of a hook, and notches or recesses at its opposite sides, in combination with the handle and the bail-wire, substantially as set forth.

4. The suspending-loop *s*, having a cross-piece, *s'*, to pass into a groove at the upper end of the handle, and ends for the reception of the attaching-rivet, substantially as set forth.

5. In combination with the dust-pan, a cast-metal rest, an eye at the upper part of the rest-piece, a hook, and the handle, substantially as set forth.

6. The combination, with a handle, of a wire bail passed into the handle, and bent at the sides of and parallel to the handle, and a clamping-band having notches or recesses at its opposite sides, slipped upon the handle and over the parallel portions of the bail-wire, substantially as set forth.

7. The combination, with a dust-pan, of a handle, a wire connected with the dust-pan and passed into the handle, and a clamping band, having notches or recesses at its opposite sides, and slipped upon the handle and parallel portion of the wire, substantially as set forth.

Signed by me this 20th day of February, A. D. 1884.

FRANCIS W. CARPENTER.

Witnesses:
GEO. T. PINCKNEY,
WILLIAM G. MOTT.